UNITED STATES PATENT OFFICE.

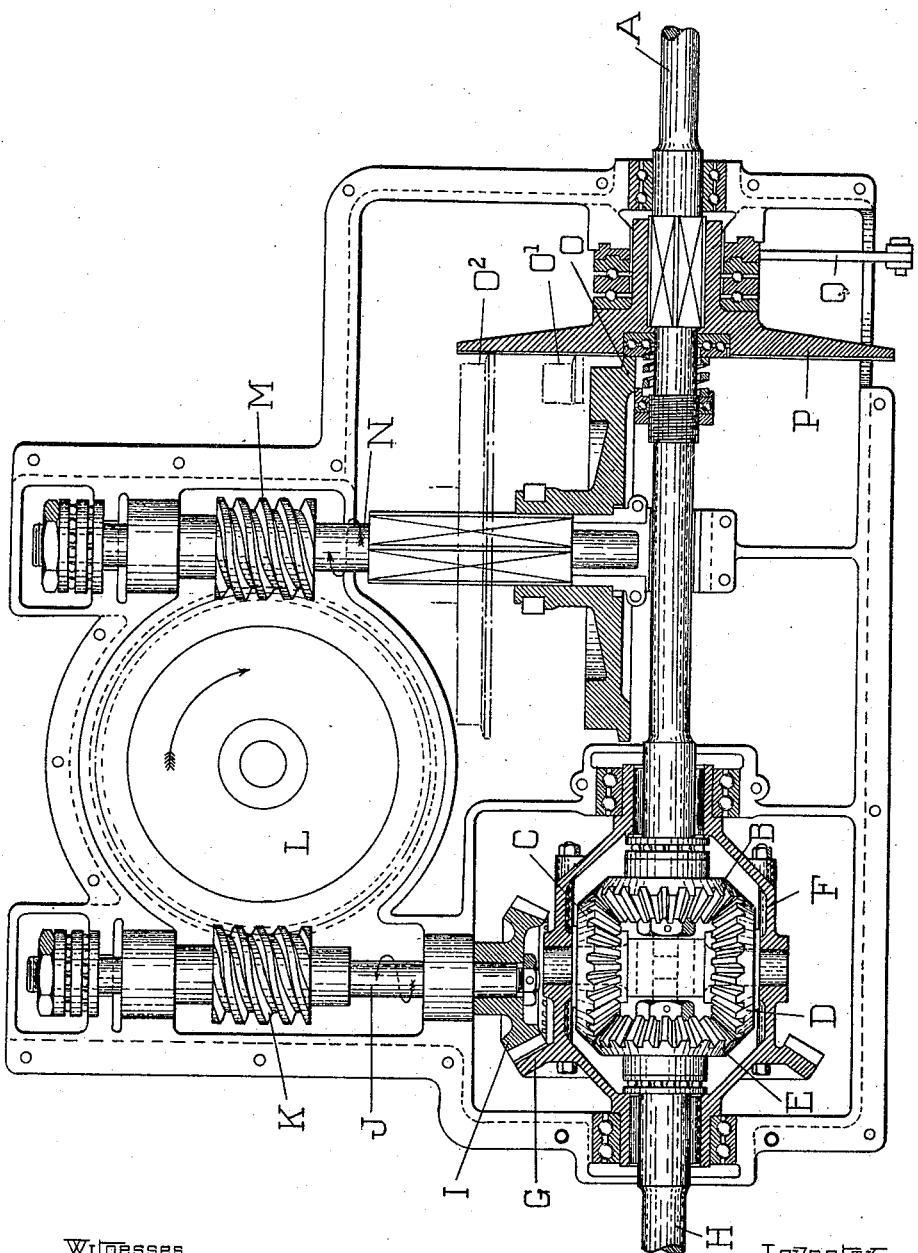

JOHN WILLIAM FISHER, OF BLACKPOOL, ENGLAND.

VARIABLE GEARING.

1,390,522.   Specification of Letters Patent.   Patented Sept. 13, 1921.

Application filed November 16, 1920. Serial No. 424,353.

*To all whom it may concern:*

Be it known that I, JOHN WILLIAM FISHER, a subject of the King of Great Britain, residing at Blackpool, in the county of Lancaster, England, have invented certain new and useful Improvements in Variable Gearing, of which the following is a specification.

This invention has for its object a variable gear adaptable for motor-cars, motor buses, trucks, power lathes, drills, and other mechanism where the gearing is required to be varied.

This gear has the combined advantages of change speed gear and the variable friction gear, and it will be seen by the following description of the working that it is not frictionally driven, the friction wheels employed acting only as a governor.

This gear would take the place of a change speed gear, or a friction gear on a motor vehicle, lathe, drilling machine, et cetera, where an infinitely variable gear is desired, but the following description of its working will be more applicable to a motor vehicle.

The invention is more particularly described with reference to the accompanying plan, in which A is the main driven or clutch shaft of the engine on which is keyed a bevel wheel B. In this at three equidistant points, gear other bevel wheels, C, D, and E, at right angles. The bevel wheels C and D are carried by a floating cage F, which also has mounted upon it a large bevel wheel G, hereafter called the free bevel wheel. These four smaller bevel wheels B, C, D and E, and the free bevel wheel G constitute the differential gear between the Cardan or other shaft H to be driven at differential speed and the engine shaft A. Gearing to the free wheel G is a bevel wheel I on a shaft J. This shaft carries a worm K working into a worm wheel L in which another worm M on a parallel shaft N works. It is found preferable that the teeth of this worm gear should be cut somewhere in the neighborhood of 18 degrees. This parallel worm shaft N has a crown wheel O which is movable on the squared portion of the shaft N and works against another disk wheel I carried on the squared portion of the shaft N and works against another disk wheel P carried on the squared portion of the engine shaft A. The crown wheel O by being moved up or down the smooth surface of the disk wheel P regulates the speed of the Cardan shaft H fast or slow, also the Cardan shaft is stationary when the crown wheel O is moved to the corresponding diameter of the disk wheel P, as shown in dotted lines at O', all the revolutions being taken up by the worm gearing as will hereafter be more fully described. At position $O^2$ of the crown wheel O shaft H has attained half engine speed, and at the neutral point where it is shown in full lines when there is no movement whatever of the worm gearing when the crown wheel O has come to rest.

The mode of action is as follows:—The Cardan shaft H offering more resistance to motion than the floating cage F, when the friction wheels O and P are engaged, the bevel wheel G being in gear with them will revolve shaft H at a speed regulated by the position of the wheel O. If however O be brought down into the position shown in full lines, it is clear of the disk wheel P, consequently the shaft A will rotate shaft H through bevel gearing B, C, D, and E at its own speed, say 1000 revolutions per minute in the opposite direction. When however the friction wheel O is moved to position shown in dotted lines at $O^2$, at half speed of 500 revolutions per minute it will allow the bevel wheel L with say 20 teeth to revolve at 500 revolutions per minute, consequently bevel wheel G, with 40 teeth will allow floating cage F to revolve at 250 revolutions per minute. Therefore with the bevel wheel B driving at 1000 revolutions per minute and the floating cage F is revolving in the same direction at 250 revolutions per minute, it will be seen that the bevel wheels C and D walk around the bevel wheel E and in so doing will take up 500 revolutions of the driven speed of the engine shaft A of 1000 revolutions a minute, consequently the speed of shaft H is the differential of the two, namely 500 revolutions per minute and a second example when crown wheel O is allowed to revolve at say 250 revolutions per minute and therefore worm shaft J carrying bevel wheel L will be allowed to revolve at 250 revolutions per minute; therefore cage F will revolve at 125 revolutions per minute, and consequently bevel wheels C and D will walk around bevel wheel E, 125 times a minute and in so doing bevel wheels C and D will revolve 250 times. Therefore the difference between this and the driving speed of bevel wheel B is 750 revolutions, therefore the Cardan shaft H will revolve at 750 revolutions a minute. A third example when crown wheel O is in position shown dotted at O', wheel O is allowed to revolve at engine speed of 1000 revolutions a minute, worm shaft carrying bevel wheel L will revolve at 1000 revolutions a minute, and again floating cage L will be allowed to revolve at 500 revolutions a minute, and bevel wheels C and D will walk around bevel wheel E 500 times, and as two revolutions of the wheels C and D are necessary to walk around the bevel wheel E once, the whole of 1000 revolutions of the engine bevel wheel B will be taken up, and therefore Cardan shaft H remains stationary. Crown wheel O, shown in full lines is in the neutral position, no movement whatever takes place of the worm gearing, the drive from the engine shaft A to the Cardan shaft H is effected direct through the bevel wheels B, C, D, and E.

When the crown wheel O is moved from the face of the friction disk P to the neutral position, the crown wheel O is so constructed that it will act as a flywheel, and therefore the degree of momentum can be arranged so that the crown wheel O continues to act as a governor to the speed of Cardan shaft H after it has been moved into the neutral position until it actually comes to rest, when Cardan shaft H attains top speed.

The crown wheel O is moved up and down on its shaft by any ordinary clutch mechanism. The pressure on the friction faces is regulated by lever Q attached to a disk having two inclined planes, each acting through 180 degrees, which engage with the two inclined planes on the frame R.

I do not confine myself to the arrangement of the friction wheels, for instance the crown wheel O and the disk wheel P could be reversed when the crown wheel O would be arranged to slide on the engine shaft A.

I declare that what I claim is:—

1. A variable speed gear comprising a driving shaft, a sun wheel on said driving shaft, a driven shaft, a sun wheel on said driven shaft, planet wheels connecting said sun wheels, a revoluble cage carrying said planet wheels, a countershaft, a driving connection between said countershaft and said cage, a worm on said countershaft, a worm wheel gearing therewith, a second countershaft, a second worm on said second countershaft meshing with said worm wheel, a friction disk keyed to but slidable along said second countershaft, a friction disk contacting therewith and keyed to said driving shaft and having a cut away center portion, and an anti-friction thrust ring in said cut away portion to allow the driven friction disk to rotate freely when displaced on to its central portion.

2. A variable speed gear comprising a driving shaft, a sun wheel on said driving shaft, a driven shaft, a sun wheel on said driven shaft, planet wheels connecting said sun wheels, a revoluble cage carrying said planet wheels, a countershaft, a driving connection between said countershaft and said cage, a worm on said countershaft, a worm wheel gearing therewith, a second countershaft, a second worm on said second countershaft meshing with said worm wheel, a friction disk keyed to but slidable along said second countershaft but having considerable added mass, a friction disk contacting therewith and keyed to said driving shaft and having a cut away center portion to allow the driven friction disk to rotate freely when displaced on to its central portion.

In witness whereof, I have hereunto signed my name this 29th day of October 1920, in the presence of two subscribing witnesses.

JOHN WILLIAM FISHER.

Witnesses:
ARTHUR ARMSTRONG,
JOHN McLACHLAN.